Oct. 28, 1969    D. E. DARR ET AL    3,475,124
METHOD OF PREPARING PIGMENTARY METAL OXIDES
Filed May 22, 1968

INVENTORS
DONALD E. DARR
GEORGE BYRON EDWARDS
CLIFFORD E. LOEHR

BY

ATTORNEYS

United States Patent Office 3,475,124
Patented Oct. 28, 1969

3,475,124
METHOD OF PREPARING PIGMENTARY
METAL OXIDES
Donald E. Darr, Wadsworth, Ohio, George Byron Edwards, New Martinsville, W. Va., and Clifford E. Loehr, Akron, Ohio, assignors to PPG Industries, Inc., Pittsburgh, Pa., a corporation of Pennsylvania
Continuation-in-part of application Ser. No. 379,520, July 1, 1964. This application May 22, 1968, Ser. No. 731,206
Int. Cl. C01g 23/06; C09c 1/36
U.S. Cl. 23—202
11 Claims

ABSTRACT OF THE DISCLOSURE

The production of pigmentary metal oxides, e.g., titanium dioxide, by vapor phase oxidation of metal halide, e.g., titanium tetrachloride, in a reaction chamber is discussed. Removal of the product effluent stream from a reaction chamber having an internal refractory wall over a smooth exit surface to avoid metal oxide build-up is described.

CROSS-REFERENCE TO RELATED APPLICATIONS

This application is a continuation-in-part of our earlier application Ser. No. 379,520, filed July 1, 1964, now abandoned.

BACKGROUND OF THE INVENTION

In the production of metal oxide by vapor phase oxidation of one or more metal halides, either in the presence or absence of a fluidized bed, metal halide is oxidized by reaction in the vapor phase with an oxidizing or oxygenating gas, e.g., oxygen, air, oxygen-enriched air, or a gas which liberates free oxygen such as NO, $NO_2$, and $H_2O_2$. The oxidation reaction is typically conducted in a relatively confined reaction chamber, often constructed or lined with a refractory material such as ceramic brick, maintained at a temperature at which the metal halide and oxygen react. Where the reactants are, for example, titanium tetrachloride and oxygen, the temperature of reaction is above 600° C., usually from 700° C. to 1600° C., and preferably from 900° C. to 1300° C.

The reactants are preferably introduced separately into the reaction chamber via an arrangement of concentric tubes or nozzles such as shown in U.S. Letters Patent 2,968,529 issued to Wilson. In more sophisticated processes, such as disclosed in U.S. Letters Patent 3,068,113 issued to Strain et al. and U.S. Letters Patent 3,069,281 issued to Wilson, additional gas streams, e.g., inert gases, are also separately introduced into the reactor via concentric tubes. Pigmentary metal oxide product produced in the chamber is then withdrawn from the chamber, preferably at the bottom, in a gaseous effluent product stream.

It has been observed that metal oxide growth occurs around the openings or mouths of the nozzle tubes and also forms on the reactor walls. It has also been observed that when the effluent product stream is withdrawn from the reactor, particularly through an exit having a cross-sectional area substantially less than that of the oxidation reaction chamber, pigmentary metal oxide in the stream and especially pigmentary titanium dioxide precipitates on the ceramic brick at the exit of the chamber, adheres thereto and forms scale-like metal oxide deposits. If such metal oxide deposits are not prevented or removed, there results a continuous precipitation and deposit of metal oxide until the scale build-up eventually plugs the exit of the reactor.

BRIEF SUMMARY OF THE INVENTION

It has been discovered surprisingly that the metal oxide deposit build-up on the surface of such reaction chamber refractory exit can be prevented by providing a smooth surface around the ceramic brick work at the reaction chamber exit.

Thus, in the practice of this invention, there is provided a smooth surface, e.g., a smooth metal surface, between the ceramic brick and the effluent gaseous stream containing suspended metal oxide. The smooth surface is advantageously maintained below the temperature at which corrosion occurs due to the presence of halogen gas, e.g., chlorine. In the preferred practice of the present invention, a smooth metallic layer, e.g., a nickel ring or frame, is constructed on top of and adjacent to the ceramic brick in and around the mouth of the reactor exit. The metallic surface in contact with the product effluent stream can be kept at any required temperature, e.g., to prevent corrosion, by internally cooling such surface with any conventional cooling fluid and preferably with air or water.

BRIEF DESCRIPTION OF THE DRAWINGS

Reference is made to the drawing and the figures thereon wherein.

DETAILED DESCRIPTION

Figure 1:
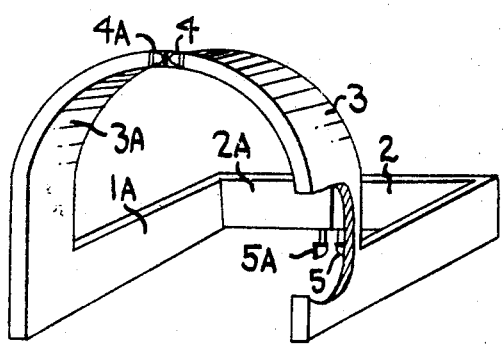
FIGURE 1 represents a three-dimensional view of one particular embodiment of the present invention.

This invention relates to the manufacture of metal oxides, particularly pigmentary white metal oxides. More particularly, this invention relates to the production of titanium dioxide by vapor phase oxidation of titanium tetrahalide, e.g., titanium tetrachloride, titanium tetrabromide and titanium tetraiodide.

The manufacture of metal oxide by vapor phase oxidation of metal halide is a well-known class reaction of which the manufacture of titanium dioxide is a member. The general techniques and conditions for producing titanium dioxide have been established and reference is made to U.S. Letters Patent 3,214,284, which is incorporated herein, in toto, by reference, for a discussion of such techniques and conditions.

At the temperatures of titanium dioxide production by the above-recited reaction, i.e., from about 900° C. to 1,300° C., the corrosiveness of titanium tetrahalide, especially titanium tetrachloride and halogen, especially chlorine, which is liberated as a result of the oxidation of the titanium tetrahalide, is great. As a result, the reaction chamber is typically fabricated or lined with a refractory material, such as ceramic brick. It has been observed, however, that metal oxide, especially titanium dioxide, deposits from the gaseous effluent product stream in which it is entrained, onto the surface of the refractory material at the exit of the reaction chamber. This deposition is especially noticeable when the exit has a smaller cross-sectional area than that of the reaction chamber and/or when the effluent product stream is withdrawn in a direction difference from the direction of the flow of reactants into the reaction chamber, e.g., at an angle of from 10° to 90° to the line of flow of the reactants. If allowed to persist, the aforementioned deposits will gradually build up and eventually plug the exit of the reaction chamber completely.

It has now been discovered that if the exit opening of a reaction chamber having an internal refractory wall or lining is covered or substituted with a smooth surface, the continuous deposition of metal oxide, especially titanium dioxide, is prevented and plugging of the exit opening does not occur.

The surface of the exit opening over which the gaseous product effluent containing entrained metal oxide is withdrawn should be sufficiently smooth to prevent adhesion of the metal oxide to its surface. Preferably, the surface will have an absolute roughness substantially less than about 0.0005 foot. Most preferably, the surface will have an absolute roughness of less than about 0.000005 foot; however, surfaces having absolute roughness values between the aforementioned stated values are operable and can be used. For example, metallic surfaces having an absolute roughness of about 0.00025 foot have been used and found effective for preventing blockage of the reaction chamber exit.

Typically, the surface of the exit opening will be fabricated of a smooth metal. It is also feasible to employ a ceramic material providing it has a smooth surface, e.g., a glazed ceramic. However, most ceramics have low thermo-conductivity values relative to metals, and if it is necessary to internally cool the ceramic, its wall would have to be relatively thin.

When the surface of the exit is metallic, it is necessary that the metal be capable of resisting the corrosive atmosphere of the gaseous product effluent in addition to having a smooth surface. Nickel or nickel alloys have been found to be preferred for this purpose; however, other suitable metals or alloys can be used. Of particular utility is Nickel 200 which is commercially available from the Huntington Alloy Products Division of the International Nickel Company, Inc. Its composition is 99.5 percent nickel, 0.06 percent carbon, 0.25 percent manganese, 0.15 percent iron, 0.005 percent sulfur, 0.05 percent silicon, and 0.05 percent copper. Also utilizable are nickel-copper alloys, e.g., Monel alloy 400, and nickel-chromium alloys, e.g., Inconel alloy 600. The chemical compositions and physical properties of Monel alloy 400 and Inconel alloy 600, as well as the physical properties of Nickel 200 can be found in the handbook of Huntington Alloys, copyright by the International Nickel Company, Inc., Second Edition, May 1963. This handbook is incorporated herein, in toto, by reference. Reference is also made to the alloys of nickel and titanium listed on pages 1694 through 1697 of Machinery's Handbook, fifteenth edition, published in 1955, by the Industrial Press, 93 Worth Street, New York 13, New York.

Where the surface of the exit of the reaction chamber is subject to corrosion from the gaseous product effluent at the temperature of the effluent, it is necessary to cool the surface, e.g., by internal cooling, to a temperature at which the surface will resist the effects of the corrosive environment in which it is placed. The particular temperature at which the exit surface is kept is dependent on the material used for the surface and the available cooling medium. Typically, the surface will be at a temperature of from about 55° F. to 150° F. Lower temperatures than 55° F. can be obtained if colder cooling fluids are used; however, generally lower temperatures are not required and are, therefore, considered to be uneconomical. Similarly, temperatures higher than 150° F. can be tolerated, i.e., up to about 2,000° F. The upper temperature limit is a function of the surface material, e.g., nickel surfaces in a chlorine atmosphere are typically kept below 1,000° F.

Figure 2:
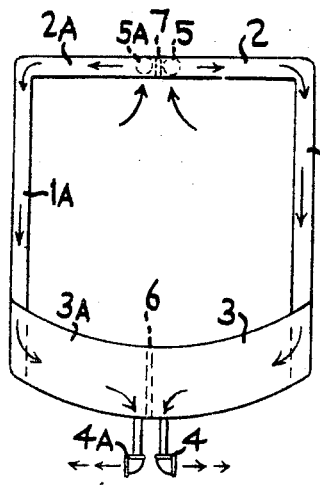
FIGURE 2 represents a top view of FIGURE 1.

Referring now to the drawing, there is shown in FIGURES 1 and 2 a frame structure constructed out of two separate hollow half portions, one portion comprising a hollow half arc section 3, a hollow side section 1, and a hollow end section 2, with a nozzle 4 connected to the interior of section 3 and nozzle 5 connected to the interior of end section 2. The other portion is comprised of hollow half arc 3A, a hollow side section 1A, and a hollow end section 2A, with a nozzle 4A connected to the interior of arc 3A and nozzle 5A connected to the interior of end section 2A. As shown in the figures, half arcs 3 and 3A are not jointed or connected internally but are separated by wall means 6. Similarly, sections 2 and 2A are separated by wall 7.

Figure 3:
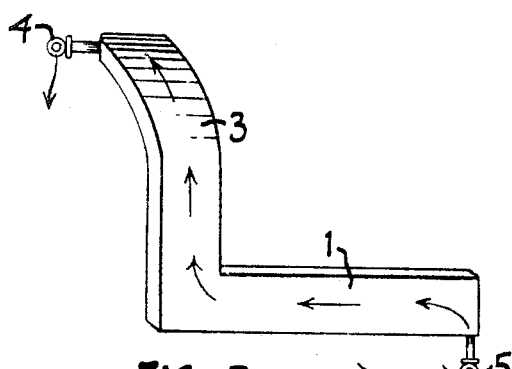
FIGURE 3 represents a side view of FIGURE 1.

As illustrated in FIGURES 2 and 3, a cooling fluid is supplied through each of the nozzles 4 and 4A, the fluid supplied through 4 flowing through sections 3, 1, and 2, and out nozzle 5; the fluid supplied through nozzle 4A flowing through sections 3A, 1A and 2A, and out nozzle 5A. If desired, the direction of flow may be reversed in either one or both portions.

Figure 4:
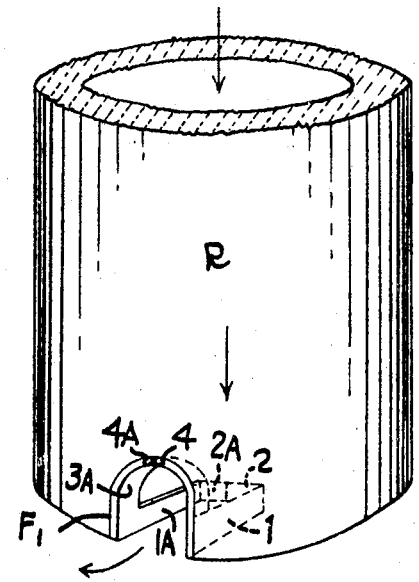
FIGURE 4 illustrates the embodiment of FIGURES 1 to 3 positioned at the bottom of a cylindrical reaction chamber.

FIGURE 4 shows the positioning of the frame $F_1$ at the bottom exit of a reactor R adjacent to the brickwork such that hot gases (containing metal oxide) exit from the reactor without contacting the ceramic brickwork around the exit opening.

Figure 5:
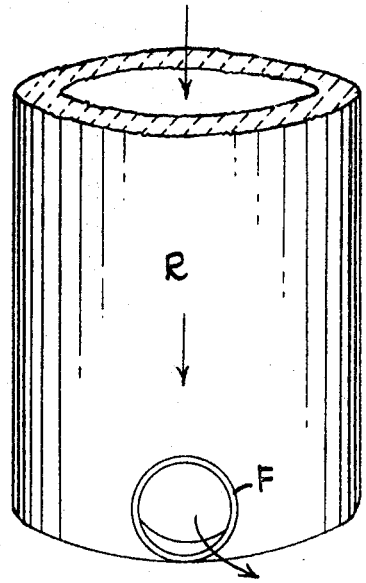
FIGURE 5 illustrates a further embodiment of the present invention.

FIGURE 5 shows a further embodiment of the present invention wherein the frame F is a hollow ring positioned within the exit of reactor R. Although not illustrated, ring F may be constructed from two half portions the same as $F_1$ with appropriate nozzles provided. On the other hand, it is equally feasible to construct both F and $F_1$ such that all portions and/or sections are internally connected whereby cooling fluid is fed through only one nozzle and withdrawn through only one nozzle.

It will be obvious to one in the art that other geometric shapes and designs may be employed other than those illustrated in FIGURES 1 to 5.

Typically, cooling fluid is supplied to the frame at a temperature below 300° F., preferably 55° F. to 90° F. Such fluid can include: water, steam, air, nitrogen, $CO_2$, argon, helium or neon, as well as any conventional heat transfer fluid. In addition, a portion of the reactants, e.g., metal halide, may be preheated by passage through the frame.

The aforementioned invention is highly advantageous in that it permits the withdrawal of the hot gaseous product effluent stream comprising pigmentary metal oxide through an exit opening having a substantially smaller cross-sectional area than the cross-sectional area of the reaction chamber, e.g., an area less than 1/3, usually less than 1/6, that of the reaction or oxidation chamber.

Furthermore, the invention simultaneously permits the changing of the direction of the gas stream flowing through the chamber, that is, the withdrawal of the effluent product stream at an angle, e.g., 90°, with respect to the direction of flow in the reactor.

The present method is further described in the following examples which are intended as illustrative only, since numerous modifications and variations thereof will be apparent to those skilled in the art.

EXAMPLE I

Thirty-six gram-moles per minute of oxygen at 1100° C. are continuously supplied to the upper portion of an elongated cylindrical reaction chamber along with 32 gram-moles per minute of titanium tetrachloride at 500° C. In addition, chlorine gas at 400° C. is continuously supplied to the reactor at the rate of 5 to 7 gram-moles per minute as a shroud between the oxygen and titanium tetrachloride streams as disclosed in U.S. Letters Patents 3,068,113 and 3,069,281.

Vaporous aluminum trichloride at 300° C. is introduced into the titanium tetrachloride stream at the rate of about 60 to 130 grams per minute before the titanium tetrachloride is supplied to the reactor. Liquid silicon tetrachloride at the rate of about 0.18 gram-moles per minute is also added to the titanium tetrachloride stream prior to its introduction into the chamber.

At the bottom and on the side of the reactor, there is provided an opening as shown in FIGURE 4, the cross-sectional area of the opening being less than 600 square inches.

The internal wall of the reactor is constructed out of ceramic bricks. The opening is provided with a smooth surface by the insertion of a nickel frame, such as illustrated in FIGURES 1 to 3, which has an average absolute roughness of about 0.00025 foot. Air at a temperature below 300° F. is circulated internally through the nickel frame at a rate of flow sufficient to maintain the smooth surface of the nickel frame at temperatures of from about 350° F. to about 1,000° F. The process is operated continuously for over 1,500 hours during which time gaseous effluent product is continuously withdrawn from the reactor through the bottom exit and over the smooth internally cooled nickel surface in a direction of flow at a ninety degree angle with respect to the reactor flow. A very light deposit of precipitated titanium dioxide is observed on the smooth surface, the total amount being insufficient to plug the reactor.

By way of comparison, the nickel frame is withdrawn from the exit of the reactor and the hot gaseous effluent product stream withdrawn from the reactor over the surface of the ceramic bricks surrounding the exit. Titanium dioxide is observed to precipitate and deposit upon the surface of the ceramic brick at the exit. The build-up of the deposit continues until the reactor finally plugs after less than 30 hours' operation.

EXAMPLE II

The procedure of Example I is repeated with a nickel frame having an absolute roughness of about 0.0005 foot. The frame is cooled internally with circulating water and is maintained within the temperature range of 55° F. to 150° F. by such cooling. The deposit of titanium dioxide on the frame is insufficient to cause plugging of the reaction chamber exit.

EXAMPLE III

The procedure of Example II is repeated with a nickel-copper alloy (Monel alloy 400) frame polished to an absolute roughness of about 0.000005 foot. No significant deposits of titanium dioxide on the frame surface exposed to the gaseous effluent product stream are observed.

Although the aforementioned invention has been described with particular reference to titanium tetrachloride, it may be employed in the vapor phase oxidation of other titanium tetrahalides such as titanium tetraiodide and titanium tetrabromide. In addition, the invention may be employed in the production of pigmentary metal oxides other than titanium dioxide.

The term "metal" as employed herein is defined as including those elements exhibiting metal-like properties, including metalloids. Examples, not by way of limitation, but by way of illustration, of pigmentary metal oxide which may be produced by the aforementioned invention are the oxides of aluminum, arsenic, beryllium, boron, gadolinium, germanium, hafnium, lanthanum, iron, phosphorus, samarium, scandium, silicon, strontium, tantalum, tellurium, terbium, thulium, tin, yttrium, ytterbium, zinc, zirconium, niobium, gallium, antimony, lead and mercury.

Obviously, many modifications and variations of the present invention are possible in light of the above teachings, and will be obvious to a skilled mechanic in the art. Thus, it is to be understood that the invention is not to be limited except as set forth in the following claims.

We claim:

1. In a process for producing pigmentary titanium dioxide by vapor phase oxidation of titanium tetrahalide selected from the group consisting of titanium tetrachloride, titanium tetrabromide and titanium tetraiodide with oxygenating gas within a reaction chamber having an internal ceramic wall wherein a product stream comprising titanium dioxide is withdrawn from the reaction chamber through an exit, the improvement which comprises preventing titanium dioxide build-up at said exit by withdrawing said product stream from the reaction chamber over a smooth exit surface having an absolute roughness substantially less than about 0.0005 foot and a temperature within the range of from about 55° F. and about 2,000° F.

2. The process of claim 1 wherein said exit surface has an absolute roughness of less than about 0.000005 foot.

3. The process of claim 1 wherein said exit surface is constructed from material selected from the group consisting of nickel and nickel alloy.

4. In a process for producing pigmentary titanium dioxide by vapor phase oxidation of titanium tetrahalide selected from the group consisting of titanium tetrachloride, titanium tetrabromide and titanium tetraiodide with oxygenating gas within a reaction chamber having an internal ceramic wall wherein a product stream comprising titanium dioxide is withdrawn from the reaction chamber through an exit having a cross-sectional area less than said reaction chamber, the improvement which comprises preventing titanium dioxide build-up at said exit by withdrawing said product stream from the reaction chamber over a smooth exit surface having an absolute roughness substantially less than about 0.0005 foot and a temperature from about 55° F. to about 2,000° F.

5. The process of claim 4 wherein the cross-sectional area of the exit is less than one-third (⅓) that of the reaction chamber.

6. The process of claim 4 wherein the product stream is withdrawn from the reaction chamber at an angle to the direction of flow within the reaction chamber.

7. The process of claim 4 wherein the exit surface is constructed from material selected from the group consisting of nickel and nickel alloy.

8. In a process for producing pigmentary titanium dioxide by vapor phase oxidation of titanium tetrachloride with oxygenating gas within a reaction chamber having an internal ceramic wall wherein a product stream comprising titanium dioxide is withdrawn from the reaction chamber through a smooth exit, the improvement which comprises preventing titanium dioxide build-up at said exit by withdrawing the product stream from the reaction chamber over a nickel alloy surface having an absolute roughness substantially less than about 0.0005 foot and a temperature from about 55° F. to about 2,000° F.

9. The process of claim 8 wherein the cross-sectional area of said exit is less than that of the reaction chamber.

10. In a process for producing pigmentary titanium dioxide by vapor phase oxidation of titanium tetrachloride with oxygenating gas within a reaction chamber having an internal ceramic wall wherein a product stream comprising titanium dioxide is withdrawn from the reaction chamber at an angle to the direction of flow within the reaction chamber and through a smooth exit having a cross-sectional area less than said reaction chamber, the improvement which comprises preventing titanium dioxide build-up at said exit by withdrawing the product stream from the reaction chamber over a nickel alloy surface having an absolute roughness substantially less than about 0.0005 foot and a temperature from about 55° F. to about 2,000° F.

11. The process of claim 10 wherein said nickel alloy surface has an absolute roughness of less than about 0.000005 foot.

References Cited

UNITED STATES PATENTS

| | | | |
|---|---|---|---|
| 2,340,610 | 2/1944 | Muskat et al. | 23—202 |
| 2,670,275 | 2/1954 | Olson et al. | 23—202 |
| 2,805,921 | 9/1957 | Schaumann | 23—202 |
| 3,078,148 | 2/1963 | Belknap et al. | 23—202 |
| 3,203,763 | 8/1965 | Kruse | 23—202 |

OTHER REFERENCES

Book by Foust et al.: "Principles of Unit Operations," pp. 440 and 401; 1960 edition, John Wiley & Sons, New York.

EDWARD STERN, Primary Examiner

U.S. Cl. X.R.

23—1, 21, 139, 140, 142, 144, 146, 148, 149, 165, 182, 183, 186, 200, 277; 106—300